Patented Sept. 1, 1925.

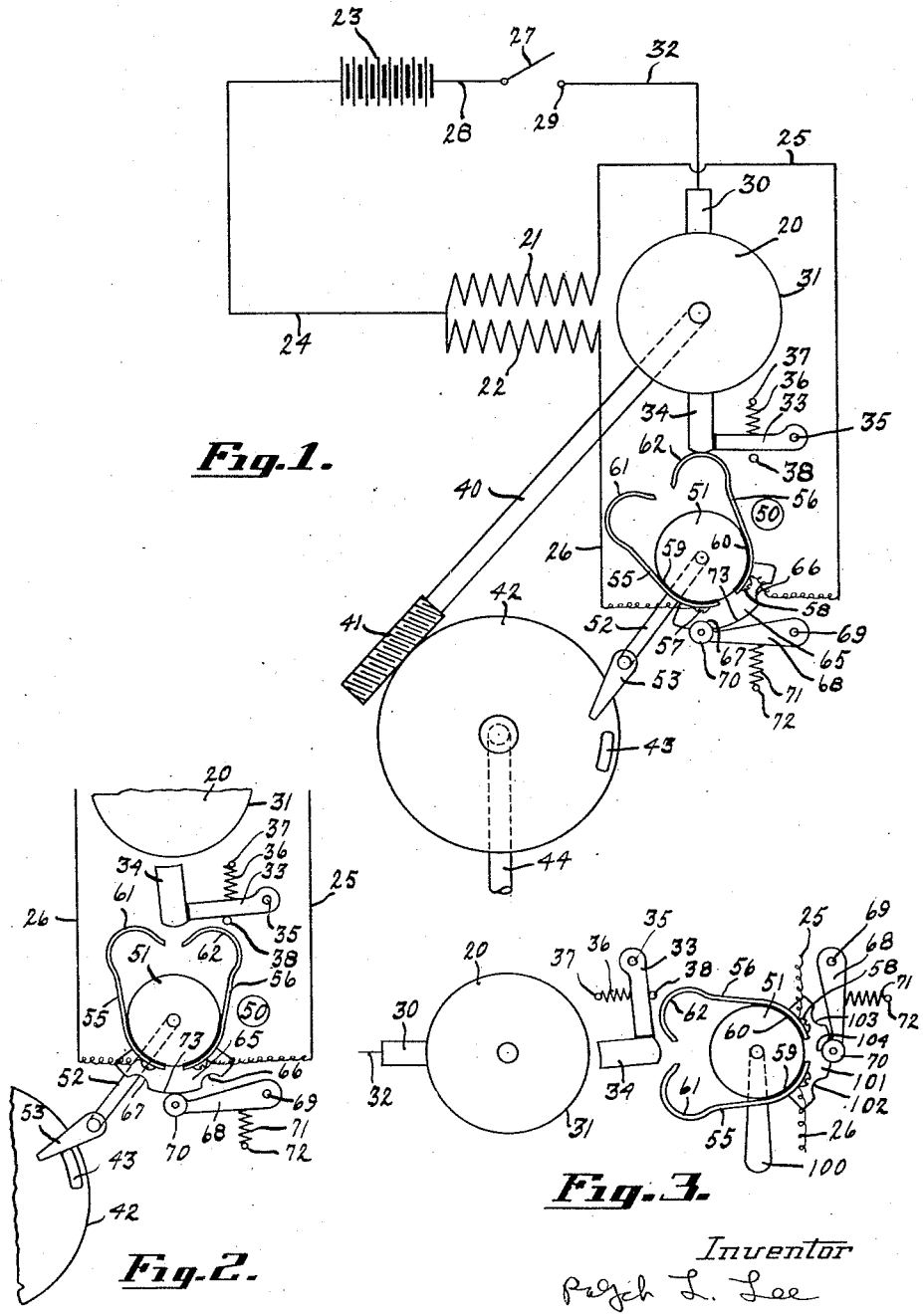

1,552,069

UNITED STATES PATENT OFFICE.

RALPH L. LEE, OF DAYTON, OHIO, ASSIGNOR TO DELCO-LIGHT COMPANY, OF DAYTON, OHIO, A CORPORATION OF DELAWARE.

MOTOR-CONTROL SYSTEM.

Application filed October 23, 1923. Serial No. 670,381.

*To all whom it may concern:*

Be it known that I, RALPH L. LEE, a citizen of the United States of America, residing at Dayton, county of Montgomery, State of Ohio, have invented certain new and useful Improvements in Motor-Control Systems, of which the following is a full, clear, and exact description.

This invention relates to electric motors, and includes among its objects to cause the motor to operate in either direction by mechanism which is simple and reliable. In order to carry out this object, the invention comprises an electric motor having fields for producing opposite magnetic effects, and means are provided for connecting one of the motor brushes with either of the fields in order that the motor will operate in either direction. This means is actuated automatically by the operation of the motor in one form of the invention and in another form this means is operated manually.

Further objects and advantages of the present invention will be apparent from the following description, reference being had to the accompanying drawings, wherein a preferred embodiment of one form of the present invention is clearly shown.

In the drawings:

Fig. 1 is a diagrammatic view of a motor and circuit connections with the mechanism embodied in the present invention applied thereto, the mechanism being shown in one of its operating positions.

Fig. 2 is a fragmentary view similar to Fig. 1, showing the mechanism in its non-operating or neutral position.

Fig. 3 is a diagrammatic view showing the present invention adapted for manual operation.

Referring to the drawings, a motor 20 is provided with fields 21 and 22 of opposite magnetic effect, one end of which is connected with a suitable source of current such as a battery 23 by wire 24. The opposite ends of fields 21 and 22 are connected with a reversing mechanism 50 to be described, by wires 25 and 26 respectively. Battery 23 is connected with a switch 27 by wire 28. A switch contact 29, adapted for engagement by switch 27, is connected with stationary motor brush 30, engaging motor commutator 31, by wire 32. Brush arm 33, carrying motor brush 34 insulated therefrom, is pivoted at 35. Spring 36, bearing against arm 33 and attached to stationary pin 37, normally tends to hold brush 34 out of engagement with motor commutator 31, and a stop 38 limits the movement of arm 33 in a direction away from the motor commutator 31.

Motor shaft 40 is provided with a worm 41 which cooperates with a worm gear 42 carrying a lug 43. Worm gear 42 has connected thereto a suitable work shaft 44 having connection with a work machine not shown.

The reversing mechanism or switch 50 comprises a disk 51 provided with a shaft 52. Shaft 52 carries a finger 53 which extends into the path of travel of the lug 43 on worm gear 42, the shaft 52 being adapted to be rotated upon engagement of lug 43 with finger 53. Current carrying spring contact members 55 and 56 are attached to disk 51 by screws 57 and 58 respectively, but are insulated therefrom by strips of insulation 59 and 60 respectively. Members 55 and 56 are connected with fields 22 and 21 respectively by wires 26 and 25 respectively. Members 55 and 56 are provided with semi-circular shaped end portions 61 and 62 which are adapted to alternately engage the motor brush 34 and push it into contact with the motor commutator 31 to thereby alternately render effective the fields 21 and 22 for operating the motor 20 in opposite directions. For preventing an overthrow of the contact members 55 and 56 in their end positions of travel, an indexing device is provided, comprising a plate 65 secured to disk 51 and provided with semi-circular notches 66 and 67. An arm 68, pivoted at 69, carries a roller 70. This roller 70 is resiliently held in contact with the edge of plate 65 by a spring 71 secured to pin 72 and bearing against arm 68.

*Mode of operation.*

Assume that the mechanism is in the position shown in Fig. 1.

Upon closing of switch 27, the flow of current will be from the battery 23, through wire 24, field 21, wire 25, contact member 56, brush 34, armature 20, brush 30, wire 32, switch 27, wire 28 back to the battery 23. The operation of motor 20 will cause motor shaft 40 to drive worm gear 42, through worm 41, in a counter clockwise direction. As gear 42 revolves in this direction, the lug 43 will engage the finger 53, thereby rotating the shaft 52 and disk 51 in a clockwise direction. As the disk 51 is rotated in that direction, the roller 70 will be cammed out of the notch 67 in plate 65 and will engage the edge surface 73 of plate 65. The portion 62 of contact member 56 will also be moved out of engagement with brush 34, thereby permitting spring 36 to push the brush 34 out of engagement with the commutator 31 and thereby break the motor circuit. The mechanism will then be in the position shown in Fig. 2. Further rotation of disk 51 in a clockwise direction will bring portion 61 of contact member 55 into engagement with brush 34, forcing it into engagement with commutator 31. At the same time, the roller 70 drops into the notch 66 in plate 65. The motor 20 will then be operated in an opposite direction, and the flow of current will be as follows: from the battery 23, through wire 24, field 22, wire 26, contact member 55, brush 34, across armature of motor 20, brush 30, wire 32, switch 27, wire 28 back to the battery 23. The worm gear 42 will then be rotated in a clockwise direction, whereupon the lug 43 will again engage the finger 53 and thereby rotate the shaft 52 and disk 51 in a counter clockwise direction, causing roller 70 to be cammed out of notch 67 into engagement with the edge 73 of plate 65, and also moving portion 61 of contact member 55 out of engagement with brush 34, permitting spring 36 to push the brush 34 away from the commutator 31 and thereby break the motor circuit. Further rotation of disk 51 in a counter clockwise direction will cause roller 70 to drop into notch 66 and portion 62 of contact member 56 to engage brush 34 and push it into engagement with commutator 31, re-establishing the motor circuit and causing the motor to operate in a reverse direction.

Fig. 3 shows the present invention adapted for manual operation. In this construction, the disk 51 is adapted to be rotated by a hand lever 100. Disk 51 carries a plate 101 having notches 102 and 103 for receiving roller 70 thereby indexing the disk 51 in its end position of travel, and an intermediate notch 104 for receiving roller 70 whereby to hold the mechanism in neutral position such as shown in Fig. 3. With the construction shown in Fig. 3, it is not necessary to use a switch, such as shown at 27 in Fig. 1.

It will be apparent, from the shape of the portions 61 and 62 of the spring contact members 55 and 56 respectively, that a good electrical contact between these portions and the brush 34 will be made before the brush 34 is pushed into engagement with the commutator 31, and that these portions are still in contact with the brush 34 after it is pushed away from the commutator 31 by spring 36 until the arm 33 strikes the stop 38. Thus any arcing caused by making or breaking the motor circuit will occur between the brush 34 and the commutator 31 rather than between the brush 34 and the spring contact members 55 and 56.

It is also apparent that the reversal of the motor has been effected by means which does not require the use of additional commutator brushes.

While the form of embodiment of the invention as herein disclosed, constitutes a preferred form, it is to be understood that other forms might be adopted, all coming within the scope of the claims which follow.

What is claimed is as follows:

1. Motor controlling mechanism comprising, in combination, a motor having a commutator, brushes and field windings for producing opposite magnetic effects, switch contacts each connected with a field winding, and means for selectively bringing the switch contacts into engagement with one of the brushes whereby the motor will operate in either direction.

2. Motor controlling mechanism comprising, in combination, a motor having a commutator, brushes and field windings for producing opposite magnetic effects, one of said brushes being normally out of engagement with the commutator, and means for selectively connecting said brush first with the field windings and then causing said brush to engage the commutator whereby the motor will operate in either direction.

3. Motor controlling mechanism comprising, in combination, a motor having a commutator, brushes and field windings for producing opposite magnetic effects, one of said brushes being normally out of engagement with the commutator, and automatic means controlled by the motor for selectively connecting said brush first to the field windings and then causing said brush to engage the commutator whereby the motor will operate in either direction.

4. Motor controlling mechanism comprising, in combination, a motor having a commutator, brushes and field windings for producing opposite magnetic effects, a movable member carrying switch contacts each connected with a field winding, means for controlling said movable member whereby at the end of its travel in either direction said member causes one of said contacts to engage one of the brushes to cause the motor to operate in either direction, both contacts being out of engagement with the brush when the movable member is in intermediate position whereby the motor circuit will be broken.

5. Motor controlling mechanism comprising, in combination, a motor having a commutator, brushes and field windings for producing opposite magnetic effects, a movable member carrying switch contacts each connected with a field winding, means for controlling said movable member whereby at the end of its travel in either direction said member causes one of said contacts to engage one of the brushes to cause the motor to operate in either direction, and means for indexing the movable member in its end positions of travel.

In testimony whereof I hereto affix my signature.

RALPH L. LEE.